(12) United States Patent
Eggers et al.

(10) Patent No.: US 6,627,324 B1
(45) Date of Patent: Sep. 30, 2003

(54) TOUGH, DIMENSIONALLY-STABLE TRANSPARENT FILM HAVING A COPOLYAMIDE LAYER CONTAINING SOLID NANOSCALE FILLING MATERIALS WITH NUCLEATING EFFECT AND ITS USE FOR PACKAGING FOODSTUFFS

(75) Inventors: Holger Eggers, Freiburg (DE); Gregor Kaschel, Bomlitz (DE); Claudia Müller, Walsrode (DE); Andreas Gasse, Walrode (DE); Rainer Brandt, Walsrode (DE); Dieter Neubauer, Bomlitz (DE); Bernd Eilers, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/807,250

(22) PCT Filed: Oct. 4, 1999

(86) PCT No.: PCT/EP99/07326

§ 371 (c)(1),
(2), (4) Date: Apr. 10, 2001

(87) PCT Pub. No.: WO00/23507

PCT Pub. Date: Apr. 27, 2000

(30) Foreign Application Priority Data

| Oct. 16, 1998 | (DE) | 198 47 845 |
| Oct. 16, 1998 | (DE) | 198 47 844 |
| Aug. 6, 1999 | (DE) | 199 37 117 |
| Jul. 28, 1999 | (DE) | 199 35 324 |

(51) Int. Cl.[7] .......................... B32B 27/08; B32B 27/34
(52) U.S. Cl. ............... 428/475.5; 428/474.4; 428/474.7; 428/474.9; 428/446; 428/448; 428/454; 524/104; 524/105; 525/432
(58) Field of Search ............ 428/423.5, 474.4, 428/474.7, 474.9, 475.5, 477.7, 704, 446, 448, 454; 524/104, 105; 525/432

(56) References Cited

U.S. PATENT DOCUMENTS

| 4,749,736 | A | | 6/1988 | Khanna et al. ............. 524/203 |
| 5,504,128 | A | * | 4/1996 | Mizutani et al. ............ 524/104 |
| 5,747,560 | A | | 5/1998 | Christiani et al. .......... 523/209 |
| 5,916,685 | A | * | 6/1999 | Frisk ......................... 428/323 |
| 6,040,392 | A | * | 3/2000 | Khanna et al. ............. 528/323 |
| 6,346,285 | B1 | * | 2/2002 | Ramesh ....................... 383/113 |

FOREIGN PATENT DOCUMENTS

| DE | 19 705 998 | 1/1998 |
| DE | 19 631 348 | 2/1998 |
| EP | 0 358 415 | 3/1990 |
| EP | 0 810 259 | 12/1997 |
| EP | 0 818 508 | 1/1998 |
| WO | 93/04118 | 3/1993 |
| WO | 93/11190 | 6/1993 |

OTHER PUBLICATIONS

Printout from www.devicelink.com, dated May 2002, 7 pages.*

* cited by examiner

Primary Examiner—James J. Seidleck
Assistant Examiner—Travis B Ribar
(74) Attorney, Agent, or Firm—Norris McLaughlin & Marcus

(57) ABSTRACT

Described is a film having at least a single layer and at least one copolyamide layer (I) containing dispersed nanoscale nucleating particles. Crystalline structures extending from the dispersed particle surfaces are formed after the layer (I) is cooled from a molten state at a cooling rate of from 10° C. to 20° C. per minute. The dispersed nanoscale nucleating particles are present in layer (I) in an amount of from 10 ppm to 2000 ppm, based on the total weight of layer (I). Also described is a method of using the film of the present invention in packaging foodstuffs.

12 Claims, No Drawings

TOUGH, DIMENSIONALLY-STABLE TRANSPARENT FILM HAVING A COPOLYAMIDE LAYER CONTAINING SOLID NANOSCALE FILLING MATERIALS WITH NUCLEATING EFFECT AND ITS USE FOR PACKAGING FOODSTUFFS

This is a 371 of PCT/EP99/07326 filed Oct. 4, 1999 (international filing date).

The present invention relates to a flexible single or multi-layer film having a layer containing partially aromatic polyamide compositions or compositions having aliphatic copolyamide, which contains between 10 and 2000 ppm of a nanodisperse filling material.

Polyamide-containing films are widely used for packaging foodstuffs.

The material polyamide has the advantage of having high mechanical strength, being a good barrier to oxygen, carbondioxide and other apolar gases, and having high resistance to high and low temperatures and scratch resistance. In addition, polyamide-containing unstretched films can be thermally formed, that is to say thermoformed into a form suitable for receiving a product to be contained. Polyamide films are flexible and are consequently able to conform to the contours of the product to be contained. This is important in the case of vacuum packs, for example.

Multi-layer films having polyamide as a strength-imparting layer are always used for packaging. Further layers are in particular a sealing layer to seal the pack securely, possibly a layer providing an extreme oxygen barrier as well as coupling layers between the other named functional layers.

Important properties of such films are attractive appearance, that is to say high gloss as well as low turbidity; in addition high mechanical resistance, in particular in the form of high resistance to destruction by buckling and creasing, termed hereinbelow resistance to fracture by buckling, are required.

For many applications a soft behaviour of the film is additionally desirable. This is the case, for example, when a number of packs made from a film are bundled in one transport outer. In the case of rigid films the corners of one pack may, under such circumstances, puncture adjacent packs.

The requirements for high resistance to fracture by buckling as well as low rigidity can be summarised as a desire for the material to behave in a tough-ductile manner. A suitable measuring method for its quantitative determination is described in the context of the Examples.

Polyamide firms may be produced by the flat or blown film extrusion process. The blown film extrusion process is preferred in many cases because it enables thick and thin regions to be staggered without incurring cutting losses, by rotation of the film bubble relative to the wind-up station of this film. Thus a wind-up quality superior to that of flat film can be achieved, which experience has taught is associated with better straight-through delivery and better film flatness.

A substantial disadvantage of producing films by the blown film extrusion process is the restriction to soft films. For films which are excessively rigid crease when the film bubble which has been formed in the round die and has then solidified is collapsed, leading to unsatisfactory film quality as well as-an inefficient production cycle.

Polyamide-containing film structures are documented, for example, in The Wiley Encyclopedia of Packaging Technology (published by M. Bakker, D. Eckroth; John Wiley & Sons, 1986) as well as in Nentwig (Joachim Nentwig: Kunststoff-Folien, Carl Hanser Verlag 1994, Munich).

Unless otherwise indicated, the convention of letter symbols for plastics in accordance with DIN 7728 or ISO 1043-1987 (E) is adopted in order to describe such polyamide-containing films and the polymers contained in the individual layers. The abbreviation HV denotes "coupling agent" and designates a polymer or polymer mixture which serves primarily to bond two adjacent layers.

In the case of multi-layer structures the layer sequence is reproduced by forming a string of the letter symbols of the polymers of the corresponding layers or of otherwise explained symbols, separated from one another by double forward slashes. Here, the sealing layer side is always on the right. It is also possible here for only a part of the complete layer sequence which makes up the film to be indicated. In these cases the sealing layer side is likewise always on the right, and layers or layer combinations which are not stated are indicated by three dots, . . . Mixtures of different polymers are indicated by the sign + as well as the bracketing together of the components, ( ). Optionally information as to the percentage composition may additionally be given here. Unless otherwise indicated, in such cases these are always percentages by weight which relate to the total weight of the mixture. Thus, for example, the expression . . . //PA//EVOH// . . . //(PE-LD+PE-LLD)//d describes a structure having an unspecified exterior layer or exterior layer sequence, followed by a layer substantially consisting of polyamide, followed by a layer substantially consisting of ethylene/vinyl alcohol copolymer (EVOH), followed by an unspecified layer or layer sequence, followed by a layer which contains a mixture of low-density polyethylene (PE-LD) and an ethylene/α-olefin-copolymer (PE-LLD), as well as a layer following on the sealing side, as d, to be specified in greater detail.

Polyamide is a partially crystalline thermoplastic polymer. Here, the polyamide structure which adjusts in a film is to a large extent dependent on the processing conditions as well as on the composition of the polyamide. The lower the cooling rate of the polyamide, the larger the crystalline structures which can form by crystallisation. Low-crystalline systems can be obtained by the use of copolyamides as a result of sterically hindered molecules. The latter may be purely aliphatic systems such as, for instance, PA 6/66 or copolymers of aliphatic elements with aromatic constituents such as, for example, PA 6/6I or PA 6/6T.

The rate of nucleus formation in the crystallisation process can be increased by nucleation. Even when cooling is rapid due to the accelerated crystallisation during cooling from the melt the major part of the crystallisation process within the film is thus concluded by the time extrusion takes place. In non-nucleated systems, on the other hand, a metastable state can arise which leads to post-crystallisation of the polyamide over a protracted period after production, because of the cooling which, in relation to the rate of crystallisation, is excessively rapid. As a result of the reduction in the specific volume of the polyamide, which is associated with crystallisation, post-shrinkage of such a film thus occurs on the roll. This is fundamentally undesirable. Substantial disadvantages which accrue from this are poor film flatness due to non-uniform shrinkage, as well as fluctuating film width, which becomes more pronounced the greater the distance from the core of the roll.

When cooling rates are very low, such as, for example, in the blown film extrusion process, according to the prior art copolyamides are used in order to obtain adequate optical properties with PA on the exterior. Because they have a low rate of crystallisation the post-shrinkage problem is also very significant for blown films despite cooling rates which are lower than those of flat films.

The prior art currently fails to meet the need for copolyamides which are nucleated such that the transparency of the film is not impaired by the nucleation, while the nucleation nevertheless effectively prevents post-crystallisation by accelerating the crystallisation process during solidification.

The use of conventional nucleating systems, in particular in the form of dispersed finely divided inorganic solid particles, is prior art. In this context WO 8802763 names in particular talc, mica, kaolin and, in the second instance, substances such as asbestos, aluminium, silicates, silver bromide, graphite, molybdenum disulfide, lithium fluoride, sodium phenylphosphinate, magnesium oxide, mercury bromide, mercury chloride, cadmium acetate, lead acetate, silver chloride, diatomaceous earth, and the like. Named systems are admixed at concentrations of between 0.001 and 1.0 per cent, in relation to the total weight of the nucleated polymer.

The addition of solid particles in the size region of less than one micrometer to polymeric matrices and specifically polyamides has likewise been described for quite some time. Such systems are used in the first instance to increase the mechanical rigidity and the gas barrier and the resistance to high and low temperatures, the flammability or the moisture absorption in the case of hydrophilic systems. A deterioration in resistance to fracture by buckling always results in conjunction with an increase in rigidity.

EP 358 415 describes a film prepared from a polyamide resin having sheet silicate dispersed therein in uniform manner, in which the individual sheets of the sheet silicate may be around 1 nm thick and have sides of up to 1 μm in length. The sheets are present in separated manner in the polyamide matrix as a result of having been opened-up in suitable manner and are 10 nm apart from one another. Films produced with this material prepared from polyamide 6 as the base polymer are distinguished by a markedly higher oxygen barrier and rigidity than those prepared from pure polyamide 6. The surface slip characteristics are improved. The transparency of single-layer amorphous-quenched flat films as well as blown films with water cooling having the structure polyamide mixture//coupling agent//PE-LD remains unchanged from that of pure polyamide 6. The Examples which are given of PA6 films having a graduated sheet silicate content clearly show the significant drop in resistance to fracture by buckling and increase in rigidity with silicate contents within the range 0 to 3.0 wt. %. Such structures are therefore unsuitable for the present requirements.

WO 9304118 as well as WO 9311190 and WO 9304117 disclose polymer nano-composites likewise having platelet-form particles in the region of a few nanometers thick. Composites of PA6 and montmorillonite or PA6 and silicates are in particular described. These materials can be processed to films. In this case alignment of the platelet-form particles parallel to the surface of the film is advantageous. Mono-film applications are described, as well as the possibility of producing multi-layer films. As an option here, the films made from this material can be stretched in order to obtain even better orientation of the nanoparticles. Advantages of such films over those having no nanoscale particles are greater rigidity, greater strength in the moist state, improved dimensional stability, a better gas barrier and lower water absorption. Substantial disadvantages of such film structures are again excessive rigidity and the associated low resistance to fracture by buckling and puncture strength. Such structures are therefore likewise unsuitable for the present requirements.

EP 818 508 discloses a mixture of from 60–98% PA MXD6 with from 2–40% of an aliphatic polyamide, which again comprises inorganic particles in the nanometer size region. Mixtures in particular with PA 6 as the aliphatic polyamide are described. Multi-layer films are in addition described as formed components which are producible therefrom. Disclosed structures always contain the described mixture as the interior and/or exterior layer. Structures having the named layer and a layer having nanoparticle-containing PA 6 and located on the outside of the film are also described. All the named structures have the advantage of a good oxygen barrier which is also unimpaired by sterilisation. Unlike films having EVOH as an oxygen barrier layer, the films patented there become only slightly turbid as a result of sterilisation. Compared with a flat film of pure PA6, a film according to the invention having the structure PA 6//(80% PA MXD6+20% PA 6 with nanoparticles)//PA 6 shows no noteworthy improvement in transparency. The principal disadvantage of such structures having a high PA MXD6 content is again the low resistance to fracture by buckling and puncture strength of this material. Such structures are consequently again unsuitable for the present requirements.

EP 810 259 likewise describes a polyamide moulding composition having nanodisperse filling materials. The desired barrier action of the polyamide can be improved by the addition of sufficiently finely divided oxides, oxyhydrates or carbonates. The diameter of the particles is preferably less than 100 nm, and they are preferably used at concentrations greater than 0.1 wt. %. The patent also describes multi-layer films having at least one layer prepared from this moulding composition in order to improve the oxygen barrier. The optical properties of the films moulded therefrom, however, deteriorate as compared with the system without additives. Corresponding films are therefore likewise unsuitable for the application in the present case.

Corresponding mono-films prepared from polyamide 6 with the sheet silicate, montmorillonite, which has been opened-up in nanodisperse manner, are distinguished by good optical characteristics, low shrinkage, markedly greater rigidity as well as greater susceptibility to fracture by buckling at 2000 ppm and 4000 ppm silicate than the unfilled film.

The object was to provide a very tough, flexible polyamide film having high gloss and high transparency, characterised by low rigidity with a high resistance to fracture by buckling, wherein the film is furthermore dimensionally stable, that is to say after production post-shrinkage is only extremely slight. It should further be producible in trouble-free and economic manner in particular on standard blown film extrusion units.

According to the invention this has been achieved by the provision of a single or multi-layer film having at least one layer (I) prepared from a copolyamide having dispersed therein nanoscale nucleating particles (P), characterised in that on a number-weighted average of all the constituents (B), the smallest particle (P) constituents (B) which form a rigid unit in the dispersion have, in at least one direction which is randomly selectable for each constituent (B), an extension of less than 100 nm, that when the layer (I) is cooled from the fully molten state at a cooling rate of between 10° and 20° C. per minute crystalline structures arise which depart from the surface of the particles (P), that the percentage by weight of the particles (P) in relation to the total weight of the copolyamide forming the layer (I) is between 10 ppm and 2000 ppm, that the polyamide composition forming the layer (I) is selected from the group comprising one or more homopolyamides and/or copolyamides, of which at least one polyamide comprises aromatic monomers, such that the aromatic monomers content in relation to the total molar quantity of the polyamide composition is not less than 3% and not more than 15%, or from the group containing one or more aliphatic polyamides which as a mixture have a DSC melting point not exceeding 205° C., at a cooling rate of 10 K/min.

The layer (I) preferably contains polyamide 6/66 or a partially aromatic copolyamide having a mole-weighted aromatic monomers content of between 3% and 15% or mixtures of polyamide 6/66 and/or polyamide 6 with partially aromatic homopolyamides or copolyamides which have a mole-weighted aromatic monomers content of between 3% and 15% in relation to the total quantity of material in the mixture.

A particularly preferred composition of the layer (I) is formed by a partially aromatic copolyamide having a mole-weighted aromatic monomers content of between 5% and 12% or mixtures of polyamide 6 with partially aromatic homopolyamides or copolyamides which have a mole-weighted aromatic monomers content of between 5% and 12% in relation to the total quantity of material in the mixture.

From this in turn, a composition of the layer (I) in the form of a partially aromatic copolyamide having a mole-weighted aromatic monomers content of between 5% and 8% particularly proves to be favourable in particular for obtaining excellent optical characteristics.

The percentage by weight of the particles (P) in relation to the total weight of the composition forming the layer (I) is preferably between 50 and 2000 ppm. Particles are preferred whereof the smallest constituents (B) which form a rigid unit in the dispersion have, in each of two mutually perpendicular directions which are randomly selectable, an extension of at least ten times the size of the constituents (B) in the direction having the smallest extension of the constituent (B). These platelet-form particles are preferably less than 10 nm thick. Thie particles used in the layer (I) are preferably sheet silicates. These may be selected from the group containing phyllosilicates such as magnesium silicate or aluminium silicate, as well as montmorillonite, saponite, beidellite, nontronite, hectorite, stevensite, vermiculite, halloysite or synthetic analogues thereof.

The layer (I) of the film according to the invention may also contain further conventional additives such as lubricants, in particular ethylene bisstearylamide, or conventional nucleating agents, in particular talc. The layer (I) may additionally comprise antiblocking agents. These are known solid inorganic particles which migrate from the exterior surface and in this way improve the surface slip characteristics of the film. Silicon oxide, calcium carbonate, magnesium silicate, aluminium silicate, calcium phosphate, talc and the like are suitable for this purpose. Of these, silicon dioxide is preferably used. Effective quantities are within the range 0.1 to 2 wt. %, preferably 0.1 to 0.8 wt. %. The average particle size is between 1 and 15 $\mu$m, with spherical particles being particularly suitable in this context.

The film according to the invention may be constructed in single or multi-layer manner. A multi-layer embodiment comprises at least one layer (I). An embodiment having more than one layer (I) may preferably contain layers (I) which differ in composition.

It is advantageous with a multi-layer embodiment of the film according to the invention to provide the layer (I) as the exterior layer on account of the high gloss.

A multi-layer embodiment of the film according to the invention may also comprise in addition to one or more layers (I) further polyamide-containing layers (II) having no, or less than 1 ppm, nanoscale nucleating agent. The layers (II) preferably comprise polyamide 6/66 or a partially aromatic copolyamide having a mole-weighted aromatic monomers content of between 3% and 15% or mixtures of polyamide 6/66 and/or polyamide 6 having partially aromatic homopolyamides or copolyamides which have a mole-weighted aromatic monomers content of between 3% and 15% in relation to the total quantity of material contained in the mixture. An embodiment of the film according to the invention without layers (II) is preferred.

A multi-layer embodiment of the film according to the invention may, in order to facilitate the heat-sealability, have a layer sequence (V), or sealing layer, on one outside of the multi-layer film. The layer sequence (V) consequently forms the inside of the multi-layer film according to the invention, which faces the product to be contained. In a preferred form the layer sequence (V) comprises the polymers or mixtures of polymers which are normally used as a sealing medium, from the group containing copolymers of ethylene and vinyl acetate (E/VA), particularly preferably having a maximum vinyl acetate content of 20% in relation to the total weight of polymer, copolymers of ethylene and unsaturated esters such as butyl acrylate or ethyl acrylate (E/BA or E/EA, respectively), copolymers of ethylene and unsaturated carboxylic acids (E/AA, E/MAA), particularly preferably having a maximum carboxylic acid comonomer content of 15% in relation to the total weight of the polymer, in a still more preferred form 8% maximum, salts of the copolymers of ethylene and unsaturated carboxylic acids, in particular E/MAA, (ionomers), particularly preferably having a maximum carboxylic acid comonomer content of 15% in relation to the total weight of the ionomer, in a still more preferred form 10% maximum, low-density polyethylene (PE-LD), particularly preferably at a minimum density of 0.91 g/cm$^3$ and a maximum density of 0.935 g/cm$^3$, high-density polyethylene (PE-HD), copolymers (PE-LLD) of ethylene and $\alpha$-olefins having at least 3 C atoms, for example butene, hexene, octene, 4-methyl-1-pentene.

The copolymers (PE-LLD) of ethylene and $\alpha$-olefins may be prepared with conventional catalysts or with metallocene catalysts. Of these, copolymers (PE-LLD) of ethylene and $\alpha$-olefins having a minimum density of 0.90 g/cm$^3$ and a maximum density of 0.94 g/cm$^3$ are particularly preferred.

The film according to the invention may also comprise a sealing layer or layer sequence (V) embodied in multi-layer manner. Thus the materials named above may be arranged, for instance in order to optimise costs, in a manner such that the individual layer which lies on the inside of the film and faces the product is distinguished by sealing which commences particularly early, and the individual layer attaching this facing the centre of the film does not melt until temperatures are higher, while in exchange being more economical, or its greater melt elasticity making such a multi-layer sealing layer producible as a blown film in the first place. Coupling polymers from the named groups of materials or polymers prepared on the basis thereof, for instance those modified with anhydride by grafting, may also be used. Examples of such structures are the layer sequences PE-LD//E/VA or PE-LD//E/AA//ionomer.

All the layers of the layer sequence (V) or individual layers thereof may be equipped additionally with additives which improve the functionality of the film. Examples are solid inorganic particles known as antiblocking agents, which migrate from the outer surface of the sealing layer and in this manner improve the surface slip characteristics of the film. Silicon oxide, calcium carbonate, magnesium silicate, aluminium silicate, calcium phosphate, talc and the like are suitable for this purpose. Of these, silicon dioxide is preferably used. Effective quantities lie within the range 0.1 to 2 wt. %, preferably 0.1 to 0.8 wt. %. The average particle size is between 1 and 10 $\mu$m, preferably 2 and 5 Mm, with spherical particles being particularly suitable in this context. In multi-ply sealing layers these particles are preferably used only in the exterior individual layer. Other additives which improve the surface slip characteristics of the inside of the multi-layer film, including in cooperation with the named solid particles, are the higher aliphatic acid amides, higher aliphatic acid esters, waxes and metal soaps as well as polydimethyl siloxanes, which are normally termed lubricants. The effective quantity of lubricant is within the range 0.01 to 3 wt. %, preferably 0.02 to 1 wt. %. The addition of higher aliphatic acid amides within the range 0.01 to 0.25 wt. % is particularly suitable. Erucic acid amide is an aliphatic acid amide which is in particular suitable for the polymers named above used in the sealing layer.

The multi-layer film according to the invention may also comprise in addition to the polyamide-containing layer(s) (I) and optionally (II) and optionally the layer sequence (V) one or more EVOH-containing layers (III) in order to improve the oxygen barrer properties, with the layers (III) preferably containing at least 50 wt. %, in relation to the total weight of the respective EVOH-containing layer, of an EVOH comprising a minimum of 85 and a maximum of 40 mol % of at least 90%-saponified vinyl acetate. In a particularly preferred form an EVOH-containing layer (III) is positioned between two polyamide-containing layers (I) and/or (II).

The film according to the invention may comprise coupling layers (IV) in addition to the layers (I), (II) and optionally (III) and (V). Such a coupling layer is preferably a laminating adhesive based on polyurethanes or polyester urethanes or is an extrudable coupling agent. Modified polyolefins are preferably used as extrudable coupling agents. In a preferred form these are polyolefins having carboxyl groups, such as, for example, polyethylene, polypropylene, ethylene/$\alpha$-olefin copolymers or ethylene/vinyl acetate copolymers, which are grafted with at least one monomer from the group comprising dicarboxylic acids having single $\alpha,\beta$-unsaturation, such as, for example, maleic acid, fumaric acid, itaconic acid or acid anhydrides, acid esters, acid amides and acid imides thereof. In addition copolymers of ethylene with dicarboxylic acids having single $\alpha,\beta$-unsaturation, such as acrylic acid, methacrylic acid and/or metal salts thereof with zinc or sodium and/or alkyl ($C_1$–$C_4$) esters thereof or corresponding graft polymers on polyolefins such as, for example, polyethylene, polypropylene or ethylene/$\alpha$-olefin copolymers, which are graft polymerised with a monomer of the named unsaturated acids, may be used as extrudable coupling agents. Polyolefins having grafted-on dicarboxylic acid anhydride having single $\alpha,\beta$-unsaturation, in particular ethylene/$\alpha$-olefin copolymers grafted with maleic anhydride, are particularly preferred. The layers bonded by a coupling agent do not generally adhere sufficiently to one another. However, coupling agent layers may also be used between two directly coextrudable layers in order, for instance, to influence the flexibility of the film.

In addition to the layers (I), (II) and optionally (III) and (V) as well as (IV) the multi-layer film according to the invention may additionally comprise further polymeric layers.

A multi-layer embodiment of the film according to the invention preferably comprises the layer (I) as an exterior layer.

The film according to the invention can be produced on conventional mono-film or multi-layer film production units.

The multi-layer film according to the invention may also after extrusion undergo a stretching operation. Orientation may be effected in the longitudinal direction only, in the transverse direction only, first in the longitudinal and then in the transverse direction, simultaneously in the longitudinal and the transverse direction or in combinations of these steps. Here, the stretching may be carried out in respect of the entire multi-layer film or in respect of part composites thereof.

The multi-layer film according to the invention may be provided on the outside or between two internal layers with a layer of a metal oxide which may be represented as MOx. This layer is preferably from 5 to 200 nm thick. In the named empirical formula x is between 1 and 2.5; M is preferably silicone, iron or aluminium.

The film according to the invention may also be printed on the outside, the inside or between individual layers.

With the film according to the invention, a film can surprisingly be successfully provided which combines very good optical characteristics and great toughness with high dimensional stability.

The film according to the invention can be made in reliable, efficient and trouble-free manner. Even at high thicknesses and with unfavourable cooling conditions the film has excellent optical characteristics in particular on standard air-cooled blown film extrusion units. Post-shrinkage on the reel no longer occurs. By contrast with conventional nucleated polyamides the film according to the invention has better transparency. Compared with nanoscale-nucleated polyamide 6 it is surprisingly soft and can hence undergo collapsing in reliable and crease-free manner.

It is surprising that the named characteristics have arisen exclusively when minute quantities of the nanoscale filling materials are added. By contrast with the published prior art, according to which nucleating agents above a given system-specific concentration lead to no further increase in effectiveness, here the addition of excessive quantities of the nucleating nanoscale filling materials leads to a considerable stiffening of the film. In this respect it was unexpected that starting from known polyamide systems, with nanoscale filling materials, a marked reduction in the content of these filling materials would eliminate the problem of rigidity and would simultaneously permanently improve the property profile as to appearance and dimensional stability.

Finally, it was unexpected that the film according to the invention would not only overcome the disadvantages which those skilled in the art have hitherto accepted in copolyamide-based blown films, which arise with regard to the optical characteristics as a result of nucleation, but would also take improvements even further in this regard.

The invention also provides the use of the films according to the invention for packaging foodstuffs.

EXAMPLES

Comparison Example 1 (V1)

A film having the structure PA//HV//PE-LD in thicknesses of 40//10//150 $\mu$m is produced as a blown film by the conventional blown film production process. The cooling air temperature is 20° C. The die diameter is 300 mm, and the film is collapsed to a width of 720 mm and is then cut to a width of 700 mm. The bubble is not, however, laid on the reel. Directly after cutting, the halves of the bubble are separated, and the film is wound up. The rate of discharge from the die is 100 kg/h. The PA-containing layer forms the outside of the film bubble.

The polyamide 6 used contains 600 ppm ethylene bis-stearylamide and is nucleated with approx. 150 ppm talc.

The coupling agent is an LLDPE grafted with maleic anhydride, having a density of 920 kg/m$^3$ and an MFI of 2.7 g/10 min., measured at 190° C., and an application weight of 2.16 kg. A material having a density of 928 kg/m$^3$ and an MFI of 1 g/10 min., measured at 190° C., and an application weight of 2.16 kg was used as the PE-LD.

Comparison Example 2 (V2)

The film of Comparison Example 1 is made with a non-nucleated polyamide 6 containing approx. 600 ppm ethylene bisstearylamide. All the other conditions correspond to Comparison Example 1.

Comparison Example 3 (V3)

The film of Comparison Example 1 is made with a mixture of 90% of a non-nucleated polyamide 6/6I having a 94 mol % ε-caprolactam content as well as 10% of a non-nucleated polyamide 6I/6T having a molar ratio of isophthalic acid monomers to terephthalic acid monomers of 7:3. All the other conditions correspond to Comparison Example 1.

Comparison Example 4 (V4)

The film of Comparison Example 1 is made with a polyamide 6 which comprises 2 wt. % montmorillonite. As a result of having been opened-up in suitable manner the montmorillonite is present in dispersed form as platelets. The platelets are approx. 1 nm thick and from 100 to 1000 nm in diameter. All the other conditions correspond to Comparison Example 1.

Example 5 (B5)

The film of Comparison Example 1, with the polyamide used being formed by a mixture of 99.5 wt. % of the polyamide composition of Comparison Example 3 with 0.5 wt. % of the polyamide of Comparison Example 4.

Example 6 (B6)

The film of Comparison Example 1, with the polyamide used being formed by a mixture of 95 wt. % of the polyamide composition of Comparison Example 3 with 5 wt. % of the polyamide of Comparison Example 4.

Example 7 (V7)

The film of Comparison Example 1, with the polyamide used being formed by a mixture of 90 wt. % of the polyamide composition of Comparison Example 3 with 10 wt. % of the polyamide of Comparison Example 4.

Comparison Example 8 (V8)

The film of Comparison Example 1, with the polyamide used being formed by a mixture of 99 wt. % of the polyamide composition of Comparison Example 1 with 1 wt. % of the polyamide of Comparison Example 4.

Comparison Example 9 (V9)

The film of Comparison Example 1, with the polyamide used being formed by a mixture of 90 wt. % of the polyamide composition of Comparison Example 1 with 10 wt. % of the polyamide of Comparison Example 4.

The following physical and technical production-related and applications-related characteristics were determined as follows on the samples which had been made:

the resistance to fracture by buckling at a temperature of 23° C. and 50% relative humidity, by rolling up a sample cut to size to form in a single layer a cylinder 198 mm long and 280 mm in circumference, and clamping it on both sides in appropriately formed holding devices. The free length of the cylinder formed by the film between the holding devices is 192 mm. With simultaneous rotation through 440° about the axis of symmetry which describes the cylinder the holding devices are brought closer together to a distance of 40 mm in a given number of cycles and at a frequency of 35 cycles per minute. The films for testing are previously maintained in an environment at 23° C. and with 50% relative atmospheric humidity for 7 days. The number of buckle fractures which result thus in the film after the pre-set number of repeats can be determined by wetting one side of the film with ammonia solution while simultaneously contacting the other side of the film with a sheet of blueprint paper. The number of blue-black marks which the ammonia causes to be discernible on the blueprint paper after 15 min is assigned to the number of buckle fractures in the tested length of film. Here, the average value of the individual values from two test specimens is taken.

turbidity in accordance with ASTM D 1003.

gloss on the outside of the film at an angle of 20° in accordance with DIN 67530.

post-shrinkage on the roll following two weeks storage at from 15 to 20° C. and from 40 to 70% relative humidity. A visual evaluation was made of deviations in roll cylindricity, up to surface corrugation, as follows:
++ no discernible post-shrinkage, cylindrical roll
+ slight post-shrinkage discernible, slight corrugation
− obvious post-shrinkage discernible, obvious corrugation
−− pronounced post-shrinkage discernible, considerable corrugation producibility as a blown film under the conditions indicated. The creasing of the film when collapsed was in particular evaluated. The distinction made was between those categories which were producible (yes) and those which were not producible (no).

The results are set out in the Table below:

| Feature (unit) | Example (B) or Comparison Example (V) | | | | | | | | |
| --- | --- | --- | --- | --- | --- | --- | --- | --- | --- |
| | V1 | V2 | V3 | V4 | B5 | B6 | V7 | V8 | V9 |
| Gloss (units of gloss) | 51 | 34 | 72 | 91 | 92 | 94 | 93 | 53 | 76 |
| Turbidity (%) | 22 | 27 | 15 | 12 | 11 | 11 | 12 | 20 | 14 |
| Hole count after 250 repeats | 6 | 4.5 | 3 | 13.5 | 3.5 | 4 | 6.5 | 7 | 9 |
| Post-shrinkage | + | + | −− | ++ | ++ | ++ | ++ | + | ++ |
| Producibility | yes | yes | yes | no* | yes | yes | no* | yes | no* |

Characteristics of the Examples and Comparison Examples
Note regarding producibility:
*the film is so rigid that creases form when it is collapsed.

What is claimed is:
1. A single or multi-layer film having at least one layer (I) of a polyamide composition having nanoscale nucleating particles dispersed therein wherein said nanoscale particles have an aspect ratio of at least 10 in two randomly selectable directions, and, on a number-weighted average a dimension of less than 100 nm in at least one direction that is randomly selectable, the amount by weight of the nanoscale particles, based on the total weight of the polyamide forming the layer (I), is between 10 ppm and 2000 ppm, and wherein the polyamide composition forming the layer (I) is selected from the group consisting of polyamide 6/66, partially aromatic copolyamides having mole-weighted aromatic monomer contents of between 3% and 15% and mixtures of at least one of polyamide 6/66 and polyamide 6 with partially aromatic homopolyamides or copolyamides having mole-weighted aromatic monomer contents of between 3% and 15% by weight of mixture.

2. The film of claim 1 wherein the particles introduced into the layer (I) are sheet silicates.

3. The film of claim 1 wherein said film also comprises in addition to one or more layers (I) further polyamide-containing layers (II) having no, or less than 10 ppm, nanoscale nucleating agent.

4. The film of claim 1 wherein said film comprises one or more coupling layers (IV).

5. The film of any one of the preceding claims, wherein said film comprises one or more further polymeric layers.

6. The film of claim 1 wherein said film is produced as a blown film.

7. The film of claim 1 wherein the layer (I) forms an exterior layer of the film.

8. The film of claim 1 wherein said film has on an outside or between individual layers a metal oxide layer from 5 nm to 200 nm thick.

9. The film of claim 1 wherein after extrusion at least the layer (I) undergoes a stretching process selected from: stretching in the longitudinal direction only; stretching in the transverse direction only; stretching first in the longitudinal and then in the transverse direction; stretching simultaneously in the longitudinal and the transverse direction; and combinations thereof.

10. A method of packaging foodstuffs, which comprises packaging said foodstuffs in the film of claim 1.

11. The single- or multi-layer film of claim 1, wherein said particles are selected from the group consisting of phyllosilicates, montmorillonite, saponite, beidellite, nontronite, hectorite, stevensite, vermiculite, halloysite and their synthetic analogs.

12. The single- or multi-layer film of claim 11, wherein said particles are phyllosilicates and said phylosilicates are magnesium silicate or aluminum silicate.

\* \* \* \* \*